May 24, 1960 R. E. PRESCOTT, JR 2,937,892
TUBE COUPLING
Filed Dec. 3, 1956

INVENTOR
Robert E. Prescott
by Wright, Brown,
Quinby May
ATTYS

United States Patent Office 2,937,892
Patented May 24, 1960

2,937,892

TUBE COUPLING

Robert E. Prescott, Jr., Hampton Road, Exeter, N.H.

Filed Dec. 3, 1956, Ser. No. 626,047

1 Claim. (Cl. 285—245)

This invention relates to a fitting for coupling a flexible tube to some other object such as a metal pipe or another flexible tube. It is an object of the invention to provide a coupling which will grip the end of the tube in such a way as to make a tight joint therewith but without such injury to the tube as would prevent reuse of the tube after it has been uncoupled. It is a further object of the invention to provide a fitting to which a tube can readily be coupled and from which it can readily be uncoupled repeatedly without injury to the tube.

For a more complete understanding of the invention, reference may be had to the following description thereof, and to the drawing, of which—

Figure 1:
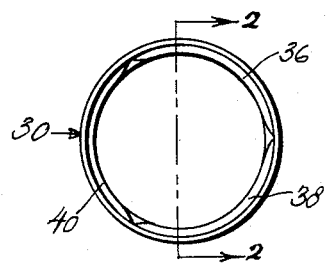
Figure 1 is an end view of a collar which is part of the invention.
Figure 2:
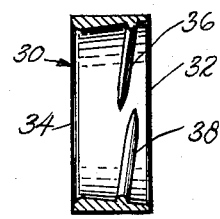
Figure 2 is a section on the line 2—2 of Figure 1.
Figure 3:
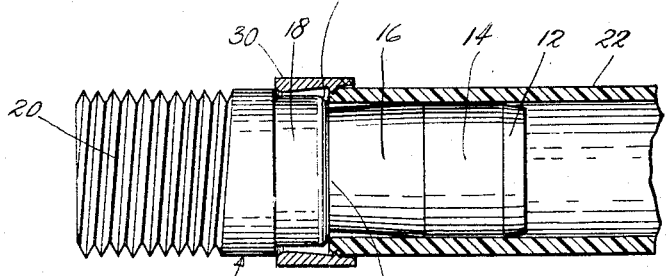
Figure 3 is a side elevation of a device embodying the invention, the collar and the plastic tube which is connected thereto being shown in section.
Figure 4:
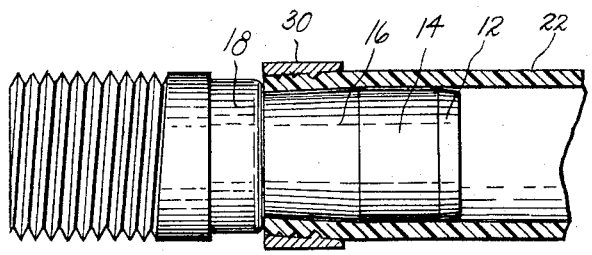
Figure 4 is a view similar to Figure 3 but with the collar moved over on to the end portion of the tube.

The invention is illustrated in Figure 3 and comprises a metal fitting 10 which is tubular and which has at the forward or entering end a chamfered portion 12 next to which is a cylindrical portion 14. Next to the cylindrical portion is a reversely tapered portion 16, the direction of taper being rearward or away from the entering end, then a cylindrical portion 18 of larger diameter. The other end portion 20 of the fitting may be screw threaded as shown or may be of any other description. The fitting 10 is a coupling device for the purpose of coupling a metal pipe (not shown) to a flexible tube 22 which may be of polyethylene or any other suitable material. The fitting is made with dimensions according to the size of the tube 22 to which it is to be attached. For example the outside diameter of the cylindrical portion 14 of the fitting is made approximately equal to the inside diameter of the tube 22. At the forward or entering end of the fitting the portion 12 is tapered so as to facilitate the entry of the fitting into the tube 22. The reversely tapered portion 16 has a taper angle of about 4 degrees or so and is of sufficient length to decrease its exterior diameter by approximately one-sixteenth of an inch. The cylindrical portion 18 has an outside diameter greater than the interior diameter of the tube 22 so that it forms a shoulder 24 which is preferably rounded as at 26 to form a stop for the end of the pipe. Next to the cylindrical portion 18 the fitting has a larger diameter so that a second shoulder 28 is at the rear end of the portion 18. A collar 30 is provided to fit loosely about the cylindrical portion 18. This collar has an interior diameter which tapers from a maximum at the entering end 32 to a minimum at the trailing end 34. The angle of taper of the interior surface of the collar is preferably equal to the angle of taper of the reversely tapered portion 16. To avoid injury to the tube 22, the inner end edges of the collar are rounded as indicated on the drawing. On the inner surface of the collar 30 are short segments of screw threads 36, 38 and 40 which are portions of a triple thread having a pitch, for example, of three-eighths of an inch. These portions preferably extend through an angle of about 120° each and are angularly disposed near the forward end of the collar as indicated in Figures 1 and 2. The use of short segments of a screw thread instead of a continuous thread makes the collar self aligning so that if it starts on the end of a tube 22 at a cocked angle it will straighten itself out as it goes along since the threads do not ride in a continuous groove. In attaching the coupling to a tube 22, the collar 30 is assembled on the cylindrical portion 18 its rear end abutting the shoulder 28, then the coupling end 12 is thrust into the interior of the tube until the end of the tube engages the shoulder 24. The collar is then rotated manually or otherwise so that the thread segments 36, 38 and 40 simultaneously start indenting grooves in the exterior surface of the tube 22. If a suitable lubricant, such as a grease which is not a petroleum base product, is applied to the outside of the tube before the collar advances thereon, the tube is less liable to slip on the fitting when the collar is rotated. This causes the collar to advance axially along the tube until the tapering interior surface of the collar cooperates with the reversely tapered portion 16 to pinch the end of the tube tightly against the exterior surface of the fitting 10. This makes a tight coupling which does not injure the tube itself so that the coupling can be removed and replaced an indefinite number of times.

The dimensions of the several portions of the fitting 10 and collar 30 may be varied as desired. The following is a satisfactory example for use with a polyethylene tube having an outside diameter of 1.3 inches and an inside diameter of 1.05 inches. The tapered entering end 12 may have a length of 9/16" and a terminal diameter of 1 inch. The cylindrical portion 14 may be 3/4" long and may have a diameter of 1.05 inches. The reversely tapered portion 16 may be 1/2" long and may taper to a minimum diameter of .98 inch. The adjoining cylindrical portion 18 may be 9/16" long with a diameter of 1.193 inches. The collar 30 may be 3/4" long with an inside diameter tapering from 1.317 inches to 1.213 inches. The foregoing dimensions are given by way of example only, and not limitation.

Figure 5:
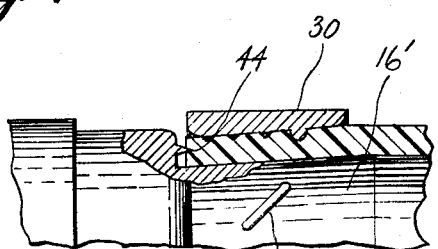
Figure 5 is a fragmentary elevation, on a larger scale and partly in section, of a modified form of the invention.

The wedge action of the collar on the portions of the tube which surrounds the tapered part 16 of the fitting produces a tight joint which will withstand pressures as high as the tube itself can safely be subjected to. Additional provision against possible leakage at the joint may be made by undercutting the shoulder between the portions 16 and 18 of the fitting. This results in a slightly modified structure as illustrated in Figure 5 in which the shoulder presents a semi-sharp circular edge 44 projecting forward therefrom against which the cut end of the tube 22 is pressed to provide an additional seal to prevent leakage at the joint. If the end of the tube is tight against the edge 44 when the collar 30 is advanced onto the tube, the wedging squeeze of the collar on the tube causes the end of the tube to press more strongly against the edge 44 so that the edge indents the annular end face of the tube. The edge 44 is preferably located in such a position as to engage the face of the tube end midway between its outer and inner boundaries.

To press the end face of the tube 22 more strongly against the edge 44, short ribs 46 may be formed on the surface on the reversely tapered portion 16' of the fitting, one such rib being shown in Figure 5. These ribs are diagonally disposed so that if the tube turns on the fitting, it will tend to move longitudinally to press against the edge 44. Any desired number of ribs 46, spaced about the fitting, may be supplied.

I claim:

A rigid coupling for a polyethylene tube, comprising a fitting having a tubular portion insertable into an end of said tube, part of said portion adjacent to the entering end thereof having a smooth cylindrical outer surface with a diameter closely equal to the interior diameter of the tube and the part of said portion next to the cylindrical part being substantially smooth and tapered in the direction away from said entering end from a diameter equal to that of the cylindrical part, said fitting having a second portion with a smooth exterior surface and a diameter slightly greater than that of said cylindrical part, said second portion making a shoulder with the smaller end of said tapered part, said fitting having a third portion of greater diameter next to said second portion and making therewith a second shoulder, and a collar loosely surrounding said second portion and adapted to abut said second shoulder, said collar having an interior surface tapering from a diameter at its forward end slightly greater than the exterior diameter of the tube to be coupled to a diameter at its rear end slightly greater than that of said second portion of the fitting, said collar having on its interior surface three segments of screw-thread rounded ridges each describing an arc of approximately 120° and uniformly arranged around the inner circumference of the collar and axially spaced to indent a triple thread when screwed onto a tube, said ridges being located near the forward end of the collar, the remainder of the interior surface of the collar being smooth.

References Cited in the file of this patent

UNITED STATES PATENTS

| | | |
|---|---|---|
| 1,064,154 | Miller | June 10, 1913 |
| 1,113,994 | Hill | Oct. 20, 1914 |
| 1,203,546 | Parsons | Oct. 31, 1916 |
| 1,275,996 | Audemars | Aug. 13, 1918 |
| 1,915,041 | Wallace | June 20, 1933 |
| 2,248,578 | McConnahie | July 8, 1941 |
| 2,439,199 | Borg | Apr. 6, 1948 |
| 2,580,818 | Mundy et al. | Jan. 1, 1952 |

FOREIGN PATENTS

| | | |
|---|---|---|
| 11,080 | Great Britain | June 7, 1894 |
| 572,488 | Germany | Mar. 17, 1933 |
| 479,296 | Great Britain | Feb. 3, 1938 |
| 151,140 | Australia | Apr. 28, 1953 |
| 159,384 | Australia | Oct. 19, 1954 |
| 156,470 | Australia | May 13, 1954 |